A. T. DAWSON & G. T. BUCKHAM.
FIRING MECHANISM OF BREECH LOADING GUNS.
APPLICATION FILED JAN. 17, 1912.

1,182,985.

Patented May 16, 1916.
7 SHEETS—SHEET 3.

UNITED STATES PATENT OFFICE.

ARTHUR TREVOR DAWSON AND GEORGE THOMAS BUCKHAM, OF WESTMINSTER. LONDON, ENGLAND, ASSIGNORS TO VICKERS LIMITED, OF WESTMINSTER, ENGLAND.

FIRING MECHANISM OF BREECH-LOADING GUNS.

1,182,985.      Specification of Letters Patent.    Patented May 16, 1916.

Application filed January 17, 1912. Serial No. 671,691.

*To all whom it may concern:*

Be it known that we, ARTHUR TREVOR DAWSON, knight, and GEORGE THOMAS BUCKHAM, subjects of the King of Great Britain, both residing at Vickers House, Broadway, Westminster, in the county of London, England, have invented certain new and useful Improvements in or Relating to the Firing Mechanism of Breech-Loading Guns, of which the following is a specification.

This invention relates to the percussive firing mechanism of breech loading guns in which the said mechanism is actuated from a part of the mounting that does not move in elevation with the gun.

According to the present invention we so construct and arrange the parts of the percussive firing mechanism that the striker releasing device carried at the breech end of the gun can be actuated by a trigger or similar device on the elevating hand wheel or lever on the mounting through the intervention of suitable mechanical actuating contrivances which may comprise appropriately arranged lever mechanism, the parts being of such a character that they remain in operative relationship with the striker releasing device at all angles of elevation of the gun. For this purpose we may provide a sliding shaft disposed longitudinally with respect to the gun and coöperating at its rear end either directly or through a member carried by the cradle, with the striker releasing device. The said sliding shaft may at its forward end be connected with a system of levers or rods coöperating with the trigger on the elevating hand wheel or lever carried by the mounting, the said system of levers or rods being so disposed that during the elevation of the gun no movement will be transmitted to the aforesaid sliding shaft.

Instead of a sliding shaft we may employ a rotary telescopic shaft the rear end of which is connected to the member carried by the cradle for coöperating with the striker releasing device and the forward end of which is connected by means of a universal joint with the spindle carried by a fixed part of the mounting near the trunnions. The said spindle may have a crank or arm to which is connected a member actuated by the trigger on the handle of the elevating hand wheel or lever. We may so construct and arrange the aforesaid member connected to the rear end of the rotary telescopic shaft, that if the trigger on the elevating handle is retained in the depressed or fired condition after the gun has returned to its run out position, the operative connection between the said member and the striker releasing device will be broken, and cannot be restored until the trigger has been released. In this manner the striker is prevented from being released as the gun reaches its run out position.

In order that the said invention may be clearly understood and readily carried into effect we will describe the same more fully with reference to the accompanying drawings, in which:—

Figs. 12, 13 and 14 are respectively a side elevation, an end elevation and a plan of a modified form of the device connected to the rear end of the rotary telescopic shaft and the striker releasing means carried by the gun, and, Figs. 15 and 16 are sections on an enlarged scale taken approximately on the line 4—4 of Fig. 14, showing the parts in two positions hereinafter referred to.

In all these figures like letters of reference indicate similar parts.

A is the gun, B the cradle, and C, C are the trunnions.

D is the elevating hand lever and $d$ the trigger carried by the handle D' of the said hand lever.

E is the longitudinally arranged shaft, which in the example shown by Figs. 1 to 6 is a sliding one and in the examples shown by Figs. 7 to 17 is rotary.

F represents the striker releasing device and $F^\times$ the device connected to the shaft E for coöperating with the said means.

In the example shown by Figs. 1 to 4 the sliding shaft E is carried by brackets B' B² on the cradle, the rear end of the said shaft being in contact with one arm $f$ of a lever constituting the aforesaid striker releasing device and the forward end being in contact with an arm or projection $e'$ on a vertical rocking spindle E'. The said spindle also has a second arm or projection $e^2$ arranged above and at right angles with respect to the first mentioned arm or projection $e'$. The inner end of a longitudinally displaceable rod $d'$ lies in contact with the said second arm or projection $e^2$ the said rod passing through the trunnion C and the boss $D^\times$ of the elevating hand lever D and lies co-axial with or approximately co-axial with the axes of the said trunnion and boss. The outer end of the said rod $d'$ lies in contact with, or is otherwise loosely disposed in relation to, one end of a rocking lever $d^2$ (Figs. 3 and 4) pivoted on an arm $D^2$ carrying the handle D' which is shown as being adjustable with respect to its distance from the axis of rotation so that a greater or smaller leverage can be obtained as desired. The other end of the said rocking lever is connected by means of the sliding collar $d^\times$ and a member $d'^\times$ with the actuating piece or trigger $d$ carried by the handle D'. When the said actuating piece or trigger is depressed, the rocking lever $d^2$ is angularly displaced about its pivot and longitudinally displaces the rod $d'$ passing through the trunnion. The movement of the said rod is transmitted by the arm or projection $e^2$ to the vertical spindle E' which movement is in turn transmitted by the arm or projection $e'$ to the aforesaid sliding shaft E. The movement of the said shaft causes the lever $f$ $f'$ on the gun to be rocked in an anti-clockwise direction to fire the gun. A recocking plunger $f^\times$ is adapted to engage with the arm $f'$ to rock the lever in a clockwise direction.

It will be obvious that as the rod $d'$ passing through the boss of the elevating hand wheel or lever and the trunnion, is arranged co-axial or approximately co-axial therewith, the inner end of the said rod will, whatever be the elevation of the gun, always remain in contact with the adjacent arm or projection $e^2$ on the vertical spindle E', and the operative relationship of the parts will therefore be maintained.

Figure 1:
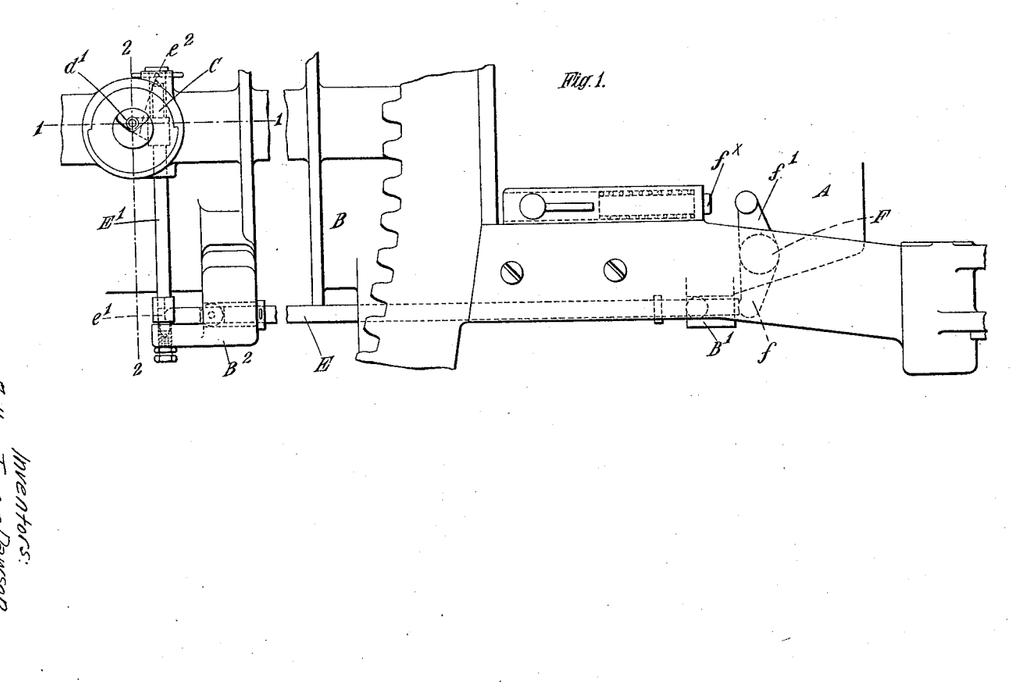
Figure 1 is a side elevation showing one constructional form of our improvements in position on a gun.
Figure 2:
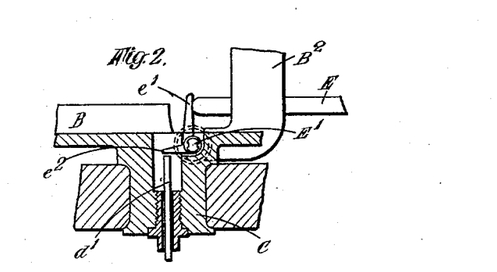
Figs. 2 and 3 are respectively a horizontal section and a vertical transverse section taken approximately on the lines 1—1 and 2—2 of Fig. 1.
Figure 3:
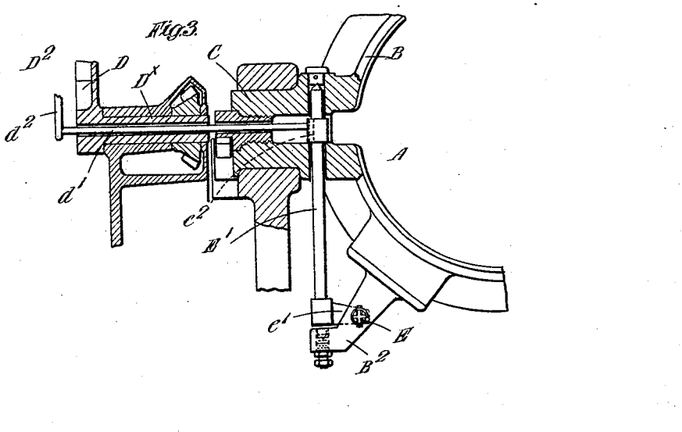
Figure 4:
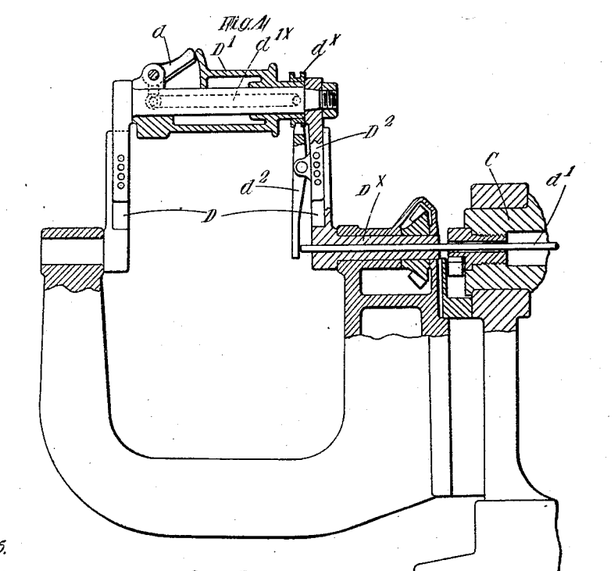
Fig. 4 is a sectional end elevation showing the elevating hand lever and its handle, with the trigger and its coöperating mechanism mounted thereon.
Figures 5, 6:
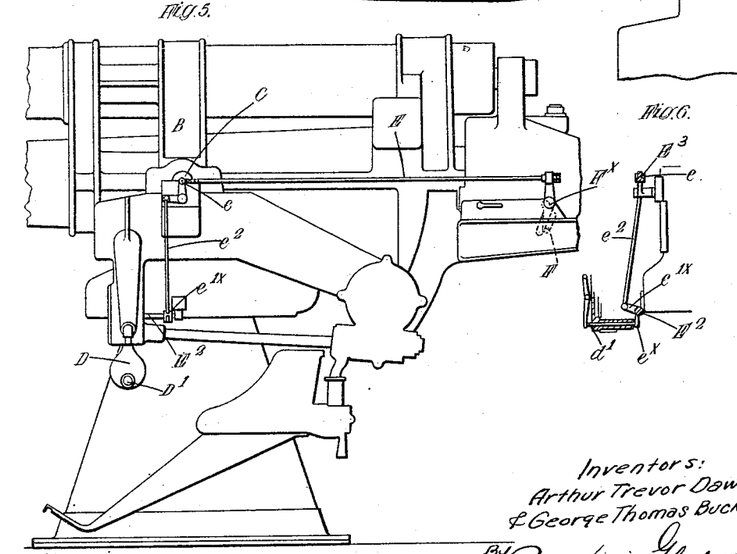
Fig. 5 is a side elevation of a mounting provided with a modified constructional form of the invention.
Fig. 6 is a sectional end elevation of the firing mechanism shown in Fig. 5.

In the example illustrated in Figs. 5 and 6 the elevating hand wheel or lever is not arranged co-axial with the trunnion. In this example the aforesaid rod $d'$ arranged co-axially in the boss of the elevating hand wheel or lever engages with an arm $e^\times$ (Fig. 6) on a shaft $E^2$. The said shaft has another arm $e'^\times$ which is connected by a link $e^2$ to one arm of a second bell crank lever $E^3$ on the mounting. The other arm of this bell crank lever $E^3$ is pivotally attached at $e$ to the aforesaid sliding shaft E, the point of attachment being in alinement with or approximately in alinement with the axis of the trunnions as is shown in Fig. 5. The rear end of the said shaft is connected to one arm of a two armed lever $F^\times$ constituting the aforesaid device for coöperating with the striker releasing device, which in the example shown is in the form of a lever F similar to that described with reference to Figs. 1 to 4. When the gun is elevated the sliding shaft E moves with the cradle about the trunnions and as the pivotal point of attachment $e$ of the said shaft with the system of levers carried by the mounting is co-axial with the trunnions, no movement is transmitted to the said levers, nor is the said sliding shaft moved longitudinally during this operation. Consequently the operative connection between the actuating piece or trigger on the handle of the elevating hand lever and the striker releasing device is not disturbed, and the latter can be operated when desired by depressing the trigger to fire the gun.

Figure 7:
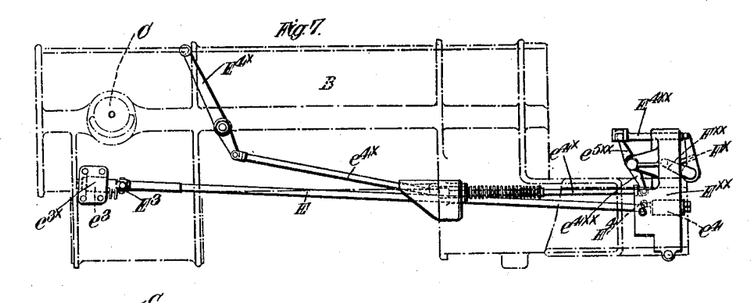
Figs. 7 and 8 are respectively a side elevation and a plan of the modified mechanism in which a rotary telescopic shaft is employed.
Figure 8:
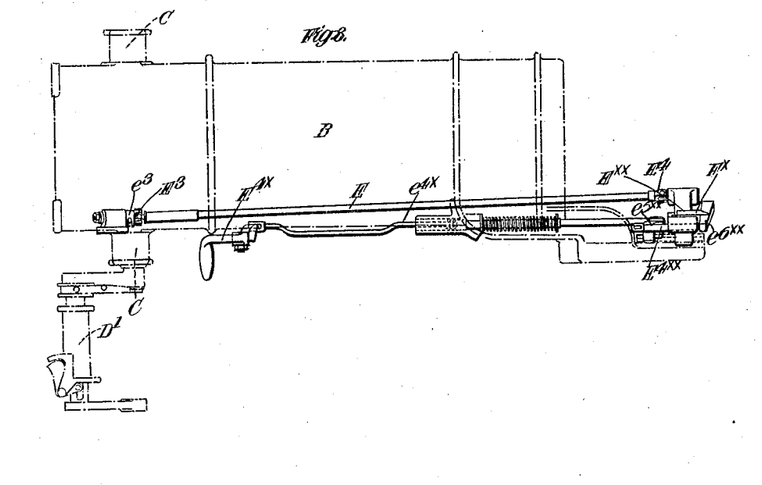
Figures 9, 10, 11:
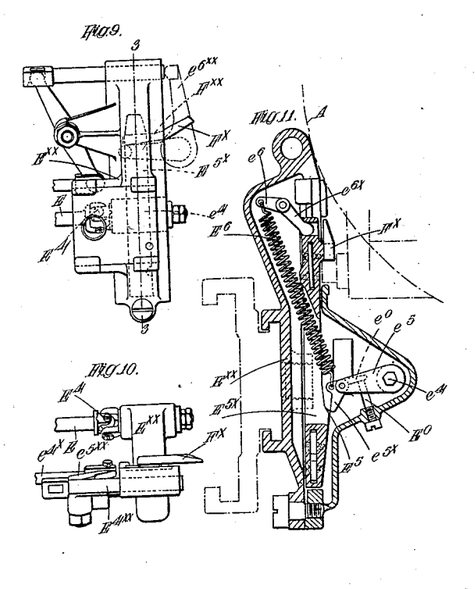
Figs. 9 and 10 are respectively a side elevation and a plan on an enlarged scale of the device connected to the rear end of the rotary telescopic shaft.
Fig. 11 is a vertical section on a still further enlarged scale taken approximately on the line 3—3 of Fig. 9.
Figure 12:
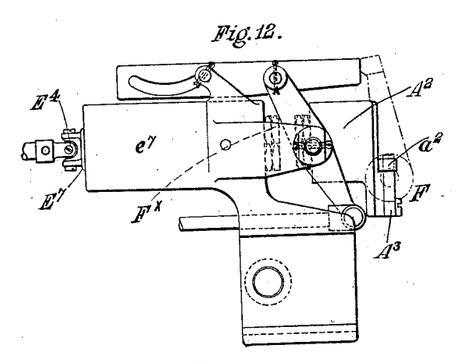
Figure 13:
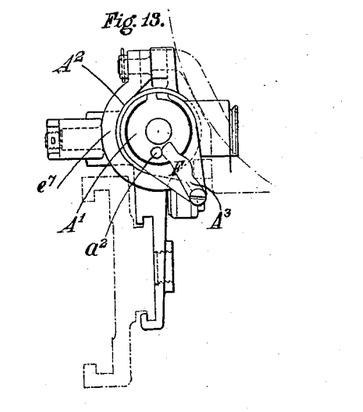
Figure 14:
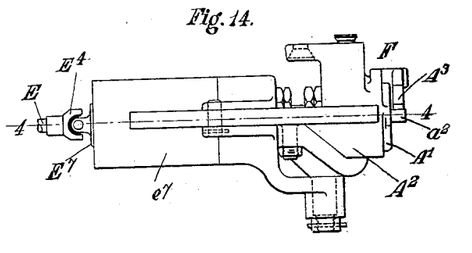
Figure 15:
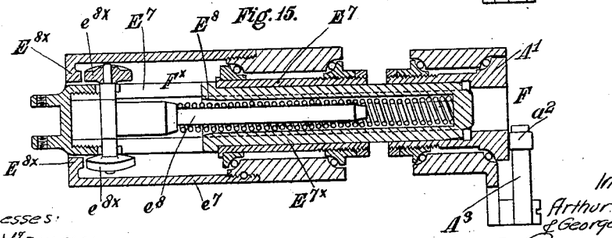
Figure 16:
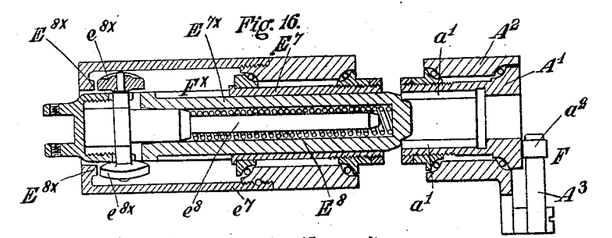
Figure 17:
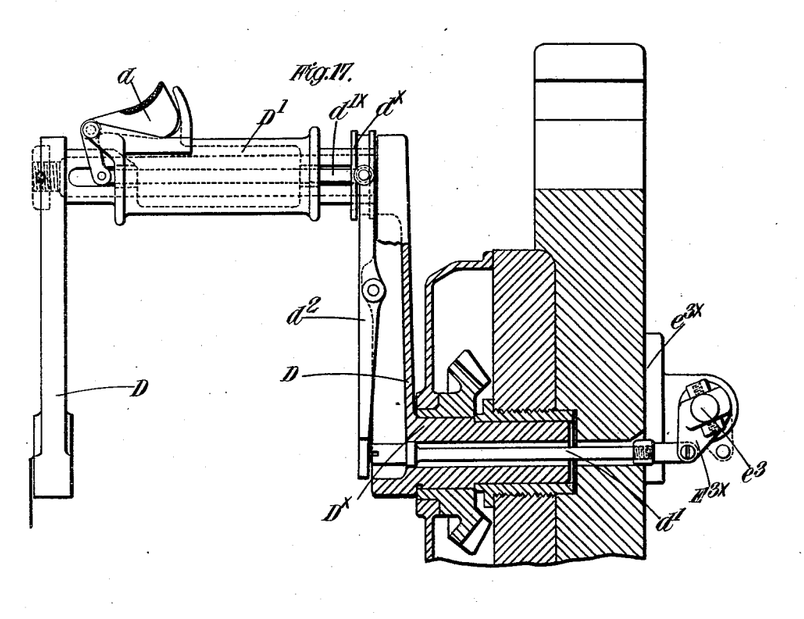
Fig. 17 is a view similar to Fig. 4 showing the connection between the trigger and the rotary shaft.

Referring more particularly to Figs. 7 to 17, E is the rotary telescopic shaft the forward end of which is connected by means of a universal joint $E^3$ with a short spindle $e^3$ carried in a bracket $e^{3\times}$ near the trunnions C, C (Figs. 7 and 8). The said spindle has a crank or arm $E^{3\times}$ (Fig. 17) which is connected to the longitudinally displaceable rod $d'$ actuated by the trigger $d$ as described, with reference to Figs. 1 to 4.

In Figs. 7 to 11 the rear end of the rotary shaft E is connected by means of a universal joint $E^4$ with a short rocking spindle $e^4$ carried in a bracket $E^{\times\times}$ on the cradle, the said spindle having a crank or arm $e^5$ to which may be pivoted the spring controlled tripping lever $e^{5\times}$ (Fig. 11) adapted to coöperate with a notch $E^5$ in a vertically sliding bar $E^{5\times}$. This bar is provided with an arm $F^\times$ constituting the aforesaid device for engaging with the firing lever on the gun, so that on the vertically sliding bar being depressed by means of the tripping lever $e^{5\times}$ when the telescopic shaft is rocked, the said arm $F^\times$ displaces the firing lever $F^{\times\times}$ to fire the gun; the parts are returned to their normal positions when the tripping lever moves out of engagement with the notch $E^5$ by the engagement of its arms $e^0$ with a stop $E^0$, by means of a spring $E^6$ (Fig. 11) on one arm $e^6$ of a two armed lever, the other arm $e^{6x}$ of which engages with the sliding bar $E^5$. A suitable recocking device is provided for actuating the firing mechanism of the gun the said device comprising a hand lever $E^{4x}$ connected to a spring controlled rod $e^{4x}$. The latter is in turn connected to one arm $e^{4xx}$ of a two-armed lever pivoted on the casing $E^{xx}$, the other arm $e^{5xx}$ being connected to a sliding rod $E^{4xx}$ whose rear end lies opposite to the recocking lever $e^{6xx}$ on the gun.

Referring more particularly to Figs. 12 to 16 the rear end of the rotary telescopic shaft E is connected by means of the universal joint $E^4$ to a sleeve $E^7$ (Figs. 15 and 16) which is carried on ball bearings in a casing $e^7$ fixed to the cradle. Slidably mounted in the said sleeve is a plunger $E^{7x}$ formed with keys adapted to engage in slots in the sleeve, and made hollow to receive a spiral spring $E^8$ and a rod $e^8$. The said rod is provided with two rollers $e^{8x}$ which engage with a helical surface $E^{8x}$ on the casing $e^7$ and thus cause the rod $e^8$ to be displaced longitudinally and the spring $E^8$ to be compressed when the sleeve $E^7$ is rotated by the rotary telescopic shaft E. When the trigger $d$ (Fig. 17) is released after firing, the spiral spring $E^8$ compels the rollers $e^{8x}$ to move along the helical surface $E^{8x}$, thereby angularly displacing the sleeve $E^7$ and the telescopic shaft and causing the parts to return to the normal position.

The plunger $E^{7x}$ extends to the rear of the sleeve $E^7$ and coöperates with the striker releasing means which comprise a sleeve $A'$ rotatably mounted in a bracket $A^2$ on the breech ring of the gun and having keyways $a'$ in which the keys of the plunger engage. An eccentrically arranged pin $a^2$ on the rear face of the said sleeve $A'$ is adapted to actuate the firing rod or shaft (not shown) either directly or as shown through an intermediate lever or link $A^3$, the said firing rod or shaft being operated when the said sleeve is angularly displaced by the aforesaid plunger $E^{7x}$. The said sleeve may alternatively be provided with a projection adapted to engage with an arm on a rotary shaft carried by the gun, in a manner similar to that described with reference to Fig. 1. The sleeve $A'$ recoils with the gun and as soon as it is out of engagement with the plunger $E^{7x}$ it is returned to its nomal position by means of the spring actuated rod of the gun mechanism (not shown). When the trigger is released the rollers $e^{8x}$ acting on the helical surfaces in the manner already described return the remaining gear to the normal position.

If the firing number of the gun's crew continues to press the trigger $d$ after the gun has been fired, the keyways $a'$ in the sleeve $A'$ on the breech ring, will not engage with the keys on the plunger $E^{7x}$ when the gun returns to the run out position owing to their being out of coincidence and the said plunger will be moved in a forward direction against the resistance of its spring $E^8$. As soon as the trigger is released the spring causes the sleeve $E^7$ carrying the plunger, to rotate as aforesaid, until the keys on the plunger are in line with the keyways $a'$ in the sleeve $A'$ (which is the position of the parts shown in Fig. 16) whereupon the plunger is returned by its spring to the normal position shown in Fig. 15.

What we claim and desire to secure by Letters Patent of the United States is:—

1. In percussive firing mechanism for recoiling ordnance, the combination with the striker releasing device on the breech end of the gun and the trigger carried by the elevating means on the mounting, of a displaceable member arranged co-axially with the axis of rotation of said elevating means, means for connecting said member to the trigger and means interposed between said member and the striker releasing device.

2. In percussive firing mechanism for recoiling ordnance, the combination with the striker releasing device on the breech end of the gun and the trigger carried by the elevating means on the mounting, of a displaceable pin arranged co-axial with the axis of rotation of said elevating means, mechanism for connecting said pin to the trigger, and mechanism interposed between said pin and the striker releasing device.

3. In percussive firing mechanism for recoiling ordnance, the combination with the striker releasing device on the breech end of the gun and the trigger carried by the elevating means on the mounting, of a displaceable pin arranged co-axial with the axis of rotation of said elevating means, mechanism for connecting said pin to the trigger, and lever mechanism and a longitudinal shaft interposed between said pin and the striker releasing device.

4. In percussive firing mechanism for recoiling ordnance, the combination with the striker releasing device on the breech end of the gun and the trigger on the elevating means arranged on the mounting co-axial with the trunnions, of a displaceable pin arranged co-axial with the axis of rotation of said elevating means, mechanism for connecting said pin to the trigger, and lever mechanism and a longitudinal shaft interposed between said pin and the striker releasing device.

5. In percussive firing mechanism for recoiling ordnance, the combination with the striker releasing device on the breech end of the gun and the trigger carried by the elevating means on the mounting, of lever mechanism and a rotary shaft interposed between the trigger and the striker releasing device.

6. In percussive firing mechanism for recoiling ordnance, the combination with the striker releasing device on the breech end of the gun and the trigger carried by the elevating means on the mounting, of lever mechanism and a rotary telescopic shaft interposed between the trigger and the striker releasing device.

7. In percussive firing mechanism for recoiling ordnance, the combination with the striker releasing device on the breech end of the gun and the trigger carried by the elevating means on the mounting, of lever mechanism, a longitudinal shaft, and means connected to said shaft for coöperating with the striker releasing device, and insuring that if the trigger is retained in the depressed or firing condition after the gun has returned to the run out position, the operative connection between said means and the striker releasing device will be broken and cannot be restored until the trigger has been released.

8. In percussive firing mechanism for recoiling ordnance, the combination with the striker releasing device on the breech end of the gun and the trigger carried by the elevating means on the mounting, of lever mechanism, a rotary shaft, and means connected to said shaft for coöperating with the striker releasing device, which means insure that if the trigger is retained in the depressed or firing condition after the gun has returned to the run out position, the operative connection between said means and the striker releasing device will be broken and cannot be restored until the trigger has been released.

9. In percussive firing mechanism for recoiling ordnance, the combination with the striker releasing device on the breech end of the gun and the trigger carried by the elevating means on the mounting, of lever mechanism, a rotary shaft operated by said mechanism, a member connected to said shaft, a member forming part of said striker releasing device, which members can coöperate only when they are in one angular position with relation to each other.

10. In percussive firing mechanism for recoiling ordnance, the combination with the striker releasing device on the breech end of the gun and the trigger carried by the elevating means on the mounting, of lever mechanism, a rotary shaft operated by said mechanism, a member connected to said shaft, keys formed on said member, a member forming part of said releasing device and keyways formed in said member for coöperating with said keys.

In testimony whereof we affix our signatures in presence of two witnesses.

ARTHUR TREVOR DAWSON.
GEORGE THOMAS BUCKHAM.

Witnesses:
 HENRY KING,
 JNO. R. CASWELL.